April 19, 1960

T. N. SCOVILLE
TUBEROSITY METER 2,932,968

Filed May 8, 1957

INVENTOR
THOMAS N. SCOVILLE
BY Raymond N. Matson
his AGENT

April 19, 1960

T. N. SCOVILLE 2,932,968

TUBEROSITY METER

Filed May 8, 1957

INVENTOR
THOMAS N. SCOVILLE

BY Raymond N. Matson
his AGENT

April 19, 1960     T. N. SCOVILLE     2,932,968
TUBEROSITY METER

Filed May 8, 1957     3 Sheets-Sheet 3

INVENTOR
THOMAS N. SCOVILLE
BY Raymond N. Matson
his AGENT

_United States Patent Office_

2,932,968
Patented Apr. 19, 1960

2,932,968
TUBEROSITY METER
Thomas N. Scoville, Reading, Pa.
Application May 8, 1957, Serial No. 657,884
10 Claims. (Cl. 73—172)

This invention relates generally to measuring apparatus and more particularly to an apparatus for making accurate determinations of the proper seat height and depth and back dimensions of a chair or seat for any given person to ensure a maximum of comfort and proper seating habits thereto, and for graphically and visually indicating the sitting contour of the person.

While manufacturers have expended large sums of money in attempting to design superior chairs and seats of almost every conceivable type, little attention other than rule of thumb has been devoted to such interrelated measurements as the height of the seat above the floor, the height of the arm above the seat, the angle and height of the back, the depth and width of the seat, and the sitting contour of the person.

The importance of the interrelation of such measurements is appreciated when contemplating the infinite variations and combinations of dimensions presented by the human form as to height, weight, the length of the upper and lower legs, and the trunk, curves of the spine, etc. The current lack of personalized or correctly fitting chair or seating design results in an increase in the tension of weariness of a person working in or seeking rest in the usual improperly designed chair. Just as important, such chairs in the office or factory materially cut down the efficiency of the workers by needlessly increasing their fatigue.

Accordingly, the chief object of the present invention is to provide a novel apparatus which will provide a visual and instantaneous indication when a chair under test is properly dimensioned to fit any given person.

An important object of the present invention is to provide a novel apparatus which will give a visual indication of the relative distribution of the weight of a person when sitting in a chair.

Another important object of the present invention is to provide a novel apparatus which will give an instantaneous visual indication when a person is properly sitting in a properly fitted chair.

A further important object of the present invention is to provide a novel apparatus having means for measuring or determining the proper dimensions, angle, height, and contour of a chair to fit a given person and other means for giving a visual indication when such fit is obtained.

A still further important object of the present invention is to provide a novel apparatus which indicates the relative percentages of a person's weight which is applied to the floor and to each inch of the seat and back areas of a chair.

Another object of the present invention is to provide a novel apparatus including an adjustable chair and means operative in connection therewith to indicate relative and/or proper distribution of the weight of a person sitting therein.

Other objects and advantages of the present invention will become apparent during the course of the following description.

In the drawings, I have shown portable and non-portable forms of the invention. In these showings:

Figure 1:
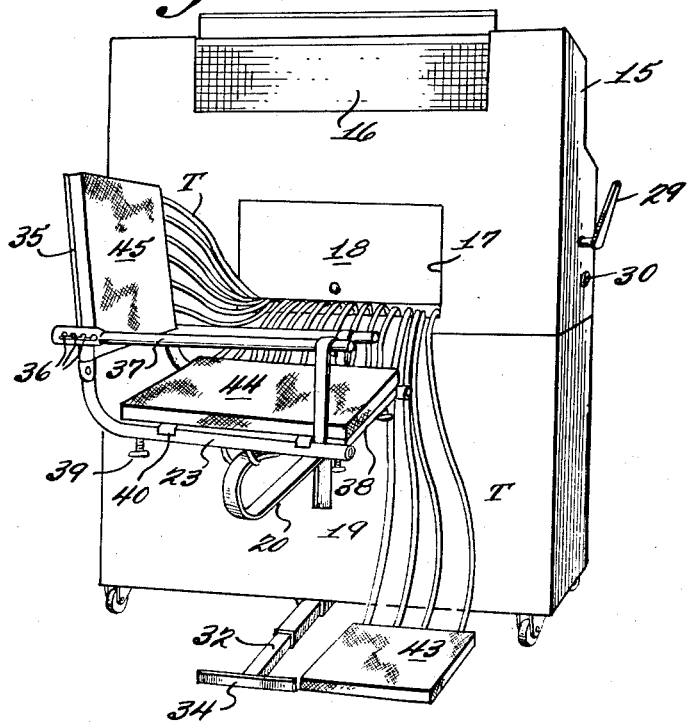
Figure 1 is a perspective view of the apparatus comprising the present invention.
Figure 1:
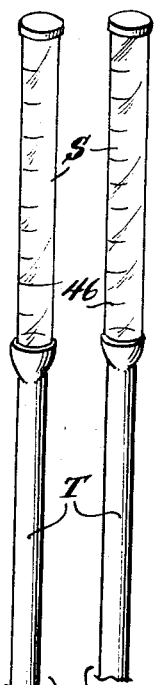

In its broadest aspects, the present invention contemplates a complete apparatus for indicating a person's weight distribution when sitting, and for correcting such distribution to acceptable norms so as to further indicate the type of chair or seat for that person which will afford a maximum of comfort and freedom from fatigue whether working or relaxing.

Referring to the drawings, numeral 15 designates a caster-wheeled cabinet which houses and supports the various elements forming a part of the invention. The front of the cabinet is provided at its upper edge with an elongated opening closed by a glass panel 16, a central rectangular opening 17 closed by a sliding panel 18 and a lower rectangular opening 19 through which projects a heavy looped, flat steel support 20 for the spaced frame members 23 of a test chair.

The inner ends of the chair support 20 are fixed at vertically spaced points to a collar 24 which is slidably on a vertically disposed metal tube 25 fixed in the cabinet 15. The collar 24 includes a projection 26 against which the head of a piston rod 27 bears to vertically adjust the position of the collar 24 (and the chair) as hydraulic pressure is supplied to the lower face of the piston in the cylinder 28 upon operation of the pump lever 29, the pressure in the cylinder being relieved by operation of the relief control button 30, all in a conventional manner.

The cabinet is prevented from tipping forwardly when a person is sitting in the test chair by means of a telescopic member 32 contained in a housing 33 fixed to the bottom of the cabinet 15 which is extendible forwardly as illustrated and provided with a floor engaging portion 34 which is retractable to a position flush with the cabinet front.

The test chair includes a back 35 pivoted to the rear ends of the frame members 23 and maintained in adjusted angular position by laterally projected studs engaging in any of a plurality of spaced holes 36 formed in the rear ends of the arm rests 37 which are rigidly supported at their front ends on the frame members 23.

The seat 38 is vertically adjustable with respect to the arm rests 37 by means of two spaced adjusting screws 39 mounted in each of the two transverse seat supports 40 which bear on the frames 23. The seat 38 is moved horizontally with respect to the back by simply sliding it and its supports forwardly or rearwardly along the frame members 23.

It will now be readily apparent that the back 35 and the seat 38 may be angularly adjusted as desired, and that the height of the seat may be varied as well as its height from the floor by the hydraulic lift. Thus, the seat is adjustable to accurately fit the general contour and dimensions of any person.

In order to determine the relative distribution of the weight of a person as between that on his feet, seat or tuberosities and thighs and back, and also of their specific seat contour, pressure pads 43, 44 and 45 containing flexible rubber tubes T spaced therewithin at fixed 1 inch intervals are respectively provided for the feet, seat 38, and back 35, the latter two being suitably detachably connected as by buttons, etc., with the pad 43 merely being placed on the floor.

Figure 3:
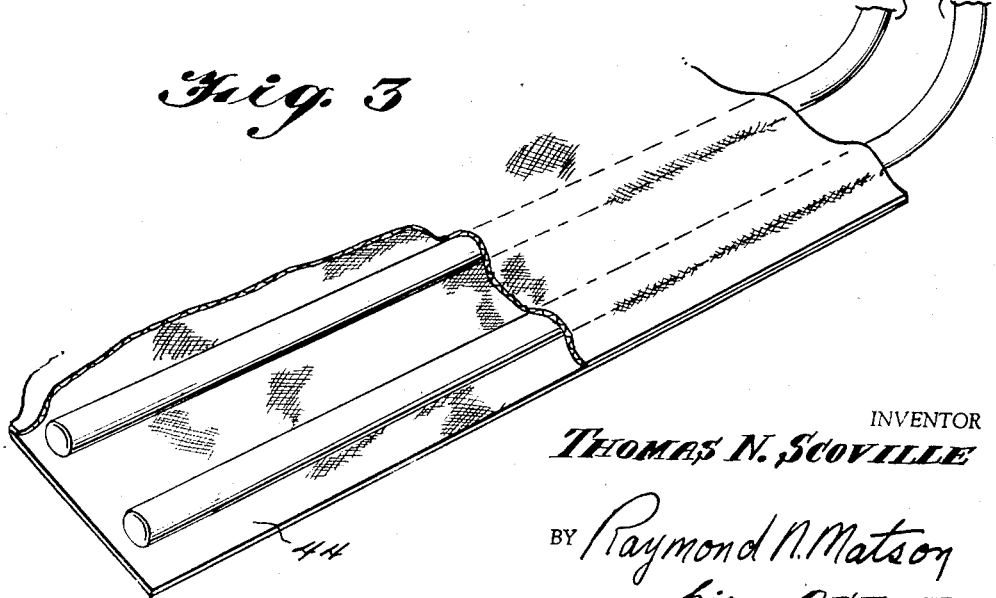
Figure 3 is a perspective view to an enlarged scale of the liquid filled tubes and glass indicating tubes connected therewith.
Figure 2:
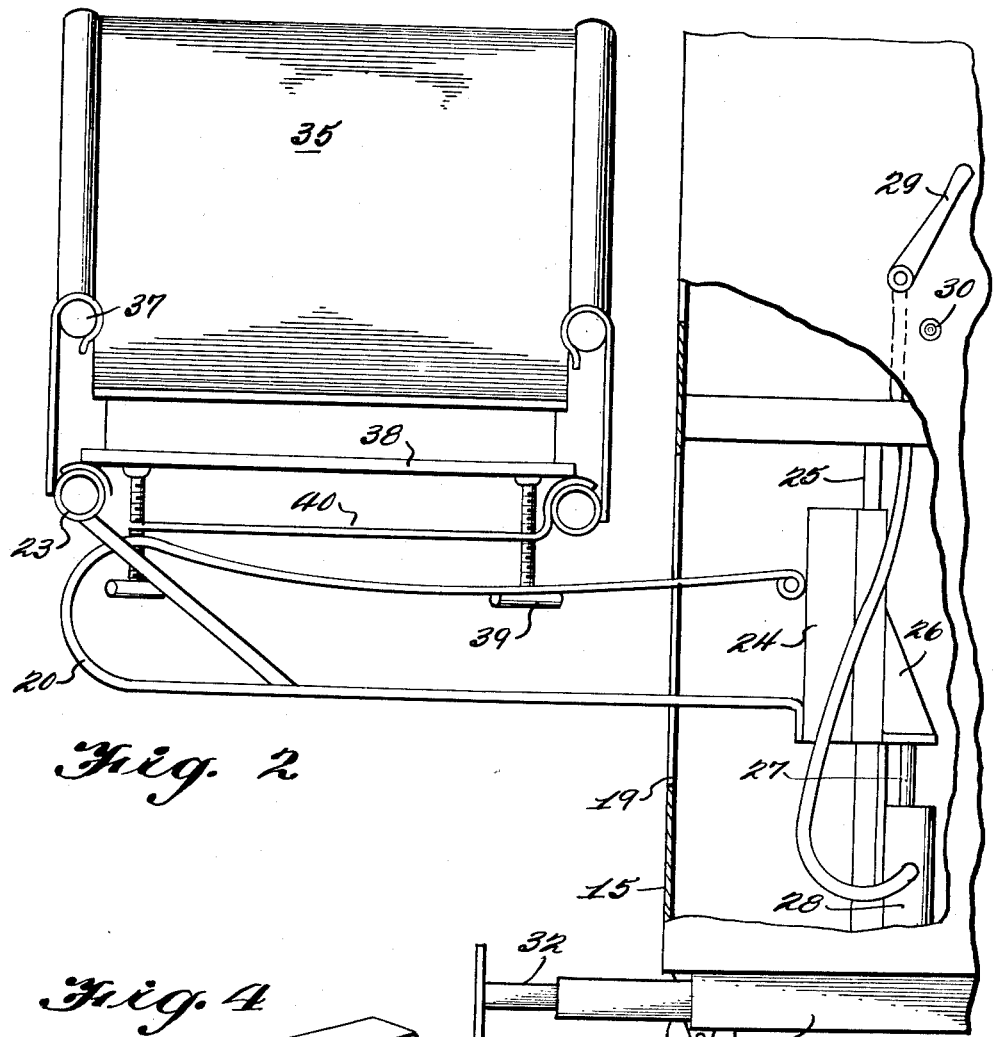
Figure 2 is a side elevational view partly in section thereof to an enlarged scale.
Figure 5:
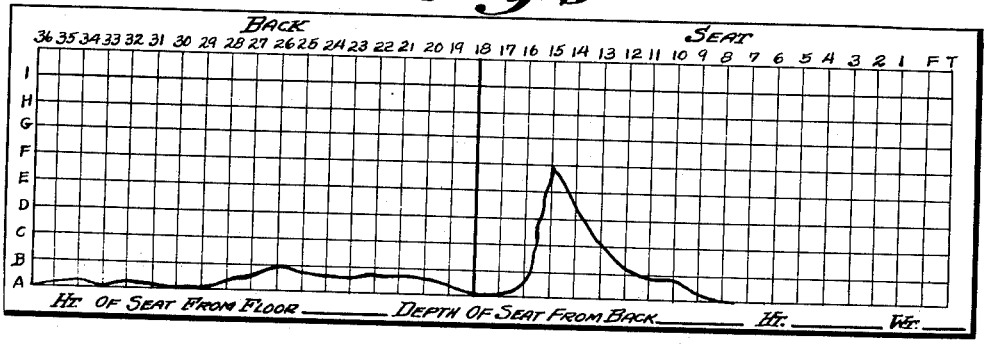
Figure 5 is a plan view of a typical graph record showing the levels to which the liquids rose in the various tubes while the chair of the apparatus was occupied by a person.
Figure 6:
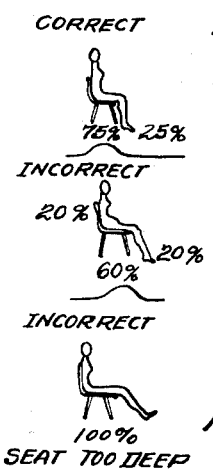
Figure 6 is a diagrammatic showing of proper and improper seating postures.

There are 2 of the flexible rubber tubes T in the foot pad 43, and 18 each in the seat and back pads 44 and 45 and each tube extends into the cabinet 15 from its pad to separate sight glass tubes S mounted side by side behind the glass panel 16 which is scaled and marked off as shown by the typical graph of Figure 5. Optionally, the glass viewing panel 16 may be plain and each of the glass sight tubes S may bear identical graduations 46 as shown in Figure 3. Each of the flexible rubber tubes T is filled with a colored liquid to a level below the glass sight tubes S.

Figure 4:
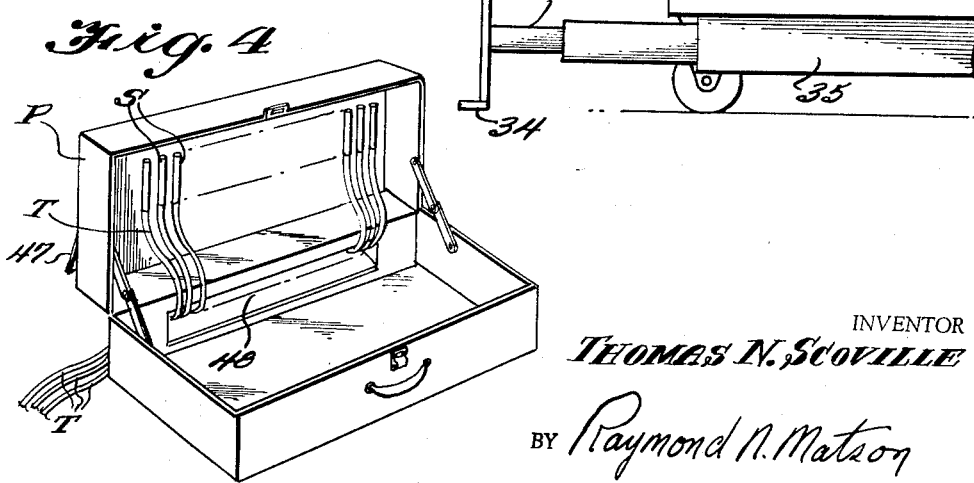
Figure 4 is a perspective view of a portable form of the invention.

The form of the invention disclosed in Figure 4 is identical in the operation of the weight distribution indicating means above and further to be described but is portable in nature. A suitcase P which may be as small as 10" x 12" x 30" is provided with a hinged door 47 which drops down to reveal the row of 38 sight glass tubes S mounted behind the opening. The bottom of the suitcase P is also provided with a hinged door 48 through which the pressure pads 43, 44, and 45 and their attached rubber tubes T are adapted to be withdrawn from their storage place within the suitcase, as fragmentarily shown, to be positioned respectively on the floor before, on the seat and on the back of a conventional chair.

One or more of a plurality of 1 inch spacing blocks or pads approximately 14" x 18" in size are placed on the floor adjacent the front of the chair so as to vary the relative chair seat height (normally 20½ inches) down to 17½ inches. Similarly, the depth of the seat may be varied by placing spacing pads against the back of the chair under the pressure pad 45. If it is desirable to vary the seat height with respect to its arm rests, spacing pads may be placed under the seat pressure pad 44. Thus, the test chair used in conjunction with the portable form of the invention is, in effect, capable of the same adjustments as the chair of the cabinet form.

In general, the weight of a person sitting in the test chair will displace fluid from the flexible rubber tubes T in the pressure pads 43, 44 and 45 and the relative weights as distributed on the spaced apart tubes will be indicated in the sight glasses S or the glass viewing plate 16, either or both of which carry the scale markings, etc., as indicated in the graph of Figure 5.

Comprehensive study and tests show that proper seating is being had when 20–25% of a person's weight is on the feet (tubes marked F and T on the plate 16 as shown by the typical graph), and 75–80% is on the seat, with a 5–10% variation in either which will show up on the tubes from the back of the seat. The graph portion of the seat when inverted, also gives a particular person's seat contour or scoop.

More specifically, the location of the raised portions and peaks of the graph—which is a mere recording of the heights of the colored liquid in the 38 tubes as viewed directly or through the glass plate 16 in either form of the invention—is a visual indication as to the correctness of the depth of the chair seat and its height from the floor. The latter may, of course, be cross checked by noting if 20–25% of the body weight is indicated by the levels as being on the foot pressure pad 43.

Moreover, the graph will indicate the proper contour of a seat and back so that persons with back curves of varying proportions and degrees will be made comfortable by proper padding at the intervals indicated. An important criterion of proper seating is the elimination of pressure from under the thighs. Thus, if the seat tubes numbered 1 to 5 show a higher liquid level in the glass sight tubes than the scale line D, it is thus indicated that the height of the seat 38 and its pressure pad 44 is too great.

An extension of the interpretation of the foregoing pressure indications as appears below, permits the scientific cataloguing and subsequent standardization of the various types of seats commonly on the market. Thus, a minimum number of basic types of chairs and seats as to size and contour can be made standard so as to ensure in a practical manner, modern seating that fits the largest number of people correctly.

As is apparent from Figure 5, the glass sight tubes S numbered 1–18 indicate the weight distributed over the seat pressure pad 44 while the tubes 19–36 indicate the pressure against the back pressure pad 45.

Seat tube #1 is at substantially the front edge of the seat 38 while tube #2 is 2 inches rearwardly thereof, etc. As viewed from the sight tubes S or the scale on the glass panel 16, a rise of the liquid in tubes 1 to 3 above the line D in their corresponding glass tubes indicates that the seat is too high or too deep (front to back). In the area of seat tubes 4 and 5, the thigh gets larger in circumference but there should be no rise of liquid in the sight tubes unless the thighs in question are extra heavy.

In the case of heavy or short people, sight tubes 6 and 7 will begin to show a slight rise of the liquid as the major weight bearing area commences here (about half way between hip and knee joints). The liquid level usually increases from tubes 8 to 15 (tuberosity pressure) with a greater increase at tube 8 for persons having a trunk of large circumference as compared to a slender person.

On the average—when setting correctly—the maximum liquid rise is at tube 15. When the maximum liquid level occurs at tubes 14, 13, 12 or 11, it is due to "slump" (sitting on the back of the sacrum) which occurs most often in tall and medium height people. If the weight of a short person shows a maximum liquid rise at tubes 11 to 13, the seat is too deep for him as, even though sitting erect, they are unable to sit with the tuberosities far enough back to show maximum liquid rise in tube 15 as the thighs are too short.

Further, the liquid level in tubes 16 and 17 drops markedly to the zero base line as this is when the convexity of the buttocks terminates except when excessive fat is present which may also show in tube 18. In cases where the back of the pelvis is extremely thin and the persons sit tightly against the chair back, tube 16 will show the maximum liquid level.

The chair back tubes numbered 19, 20, 21 and 22 which are respectively 1, 2, 3, 4, etc., inches above the seat show liquid in their sight tubes only in the case of people with a large amount of fat on the buttocks, tube 22 showing a liquid rise if the pelvis presses tightly against the chair back.

Tubes 23, 24 and 25 will show a rise in the liquid level where a person has a prominent sacrum or sits with their weight on the back of the tuberosities and back of the sacrum, tube 25 showing slightly less rise than tube 24. A liquid rise will show in the sight tube S of tube 26 if the pelvis is tight against the back, tube 27 if the lumbar spine now beginning to be a factor; in tube 27 if the lumbar spine is flattened or sagged backward; in tube 28 if the upper lumbar spine is flattened or sagged backward; and in tube 29 if the thoracic-lumbar spine sags backward.

A rise in tubes 30, 31, 32, 33 and 34 is shown by many people when sitting properly. The degree of rise and the tubes in which it occurs is dependent on a person's height, sitting position, and flexibility and use of the thoracic spine. In some tall and medium height individuals, the thoracic spine which is normally rearwardly convex, sags backward farther (a form of slump) than normal as indicated by a rise in tubes 14—13—12—11. Also, the liquid rise in tubes 30—34 will increase as the angle of the back increases.

Except in very tall people, tube 35 shows a lower liquid level as the convexity of the thoracic spine decreases in this area, while the sight tube S of tube 36 rarely shows a liquid level as the thoracic convexity is further decreased.

The two tubes marked F and T on the graph of Figure 5 are the two tubes in the foot pressure pad 43. When the seat 38 is the proper height for a person sitting therein, the liquid level in the tubes rises between the lines B and D of the scale. If there is no liquid level rise, the seat is too high and the feet are not carrying their share of the weight. Conversely, if the liquid level is above line D, the seat is too low and the feet are carrying too much weight.

In view of the foregoing, the use of the apparatus is believed to be apparent. A person sits in the test chair of either the cabinet or portable form and a graph of this initial weight distribution such as is shown in Figure 5 may be drawn by the operator of the apparatus, from the liquid levels in the 38 sight glass tubes S as shown directly thereby or by the glass panel 16 upon which a scale similar to that of the graph is marked.

The operator then adjusts the height and depth of the seat, and the angle of the back of the seat until the sight tubes show 20–25% of the weight of the person to be on their feet, 75–80% on the seat, and 5–10% against the back. The operator now draws the graph showing the various liquid levels in the 38 tubes and it is this graph which accurately determines the dimensions and contour of the chair that correctly fits the person in question as explained in detail above.

Figure 7:
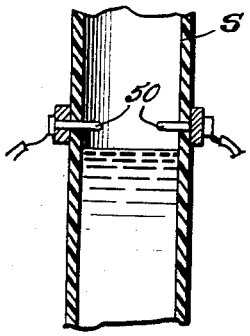
Figure 7 is a fragmentary, vertical sectional view of one of the glass sight tubes showing how the rise in liquid level in a tube will close a circuit between contacts to energize electric lamps.
Figure 8:
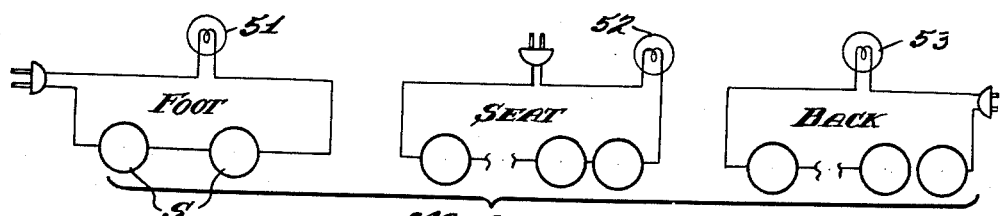
Figure 8 is a schematic diagram illustrating how pressure of the feet, seat or back of a person on the liquid filled tubes closes the circuits of one or more indicating lamps.

In the use of the chair for determining if a person's weight is distributed in accordance with any one of the basic types of seating, it is advantageous if such conformance is immediately indicated by visual means in addition to the sight tube liquid levels. To this end as shown in Figure 7, each of the glass sight tubes S may be equipped with a pair of electrodes 50 positioned at a mean average height for a given type of seating. As diagrammatically indicated in Figure 8, the tubes of each of the pressure pads may be serially connected in separate circuits so as to illuminate lamps 51, 52 and 53 when the liquid levels in the tubes rise under the pressure of a person's weight to close the circuit between the electrodes. The circuits are, of course, connected to a suitable source of power. From a practical standpoint, such tubes as 1–7 and others which seldom show a liquid level rise, may be omitted from the circuits.

In use, test chairs adjusted for basic seating types are occupied by persons estimated to be closest to the particular type and if all three lamps light, the proper seating type is thus immediately indicated. The test chairs may be set so that in each case, the foot pad lamp 51 lights if minimum pressure distribution is 22%, the seat pad 52 lights if 72% of the pressure is had, and the back pad lights if 6% pressure is had.

If one of the lamps fails to light, the person should change to a differently adjusted chair (height and depth of rest and angle of back) where proper distribution of weight may be had to illuminate all three lamps. While this procedure immediately determines the basic seating type required for the person, a graph is still required to furnish a record of the individual's personal characteristics as to dimensions and contour.

It will now be readily apparent that the apparatus comprising the present invention is an important forward step in the scientific determination of individual seating requirements and in the standardizing of the same so as to result in standards as to dimensions and contour which will enable the manufacture of seating which fits the greatest number of persons correctly.

It is to be understood that the forms of the invention herewith shown and described are to be taken as preferred examples of the same and that various changes in the shape, size and arrangement of parts may be resorted to without departure from the spirit of the invention or the scope of the subjoined claims.

I claim:

1. An apparatus for determining the weight distribution of a person in sitting position comprising a wheeled cabinet, a chair adjustably supported on said cabinet, a plurality of sight tubes mounted in said cabinet, a plurality of pressure pads mounted in the back, seat and feet area of said chair, a plurality of flexible tubes extending from within said pads to separate ones of said sight tubes, and liquid filling said flexible tubes and adapted to be displaced into said sight tubes upon the application of weight to said pads.

2. An apparatus as recited in claim 1 wherein hydraulic means is mounted in said cabinet and connected with said chair to effect vertical adjustment thereof.

3. An apparatus as recited in claim 1 wherein a pair of electrodes is mounted in at least one sight tube connected with each of said pads and each pair controls an electric circuit including a lamp adapted to be lighted to effect a visual indication of the covering of said electrodes and closing of the circuit by the liquid in said sight tube.

4. An apparatus as recited in claim 1 wherein a brace adapted to engage the floor is mounted on said cabinet and extends under said chair to prevent tipping of said cabinet when a person is seated in said chair.

5. An apparatus as recited in claim 4, wherein said brace is telescopic and retractable within the area of said cabinet.

6. An apparatus as recited in claim 1 wherein said sight tubes have the same relative arrangement as the groups of flexible tubes extending from within said pads to facilitate visual determination of the relative weight applications on said pads.

7. An apparatus for determining the weight distribution of a person in sitting position comprising a cabinet having its operative position adjacent a chair, a plurality of sight tubes mounted in said cabinet, a plurality of pressure pads mounted on the back, seat or feet area of the chair, a plurality of flexible tubes extending from within said pads to and connecting separate ones of said sight tubes in said cabinet, and liquid filling said flexible tubes and adapted to be displaced into said sight tubes upon the application of a sitting person's weight to said mounted pads.

8. An apparatus for determining the weight distribution of a person in sitting position comprising a wheeled cabinet, a chair adjustably supported on said cabinet, a plurality of sight tubes mounted in said cabinet, a plurality of pressure pads mounted in the back and seat area of said chair, a plurality of flexible tubes extending from within said pads to separate ones of said sight tubes, and liquid filling said flexible tubes and adapted to be displaced into said sight tubes upon the application of weight to said pads.

9. An apparatus for determining the weight distribution of a person in sitting position comprising a wheeled cabinet, a chair adjustably supported on said cabinet, a plurality of sight tubes mounted in said cabinet, a plurality of pressure pads mounted in the seat and feet area of said chair, a plurality of flexible tubes extending from within said pads to separate ones of said sight tubes, and liquid filling said flexible tubes and adapted to be displaced into said sight tubes upon the application of weight to said pads.

10. An apparatus for determining the weight distribution of a person in sitting position comprising a wheeled cabinet, a chair adjustably supported on said cabinet, a plurality of sight tubes mounted in said cabinet, a plurality of pressure pads mounted in the back and feet area of said chair, a plurality of flexible tubes extending from within said pads to separate ones of said sight tubes, and liquid filling said flexible tubes and adapted to be displaced into said sight tubes upon the application of weight to said pads.

References Cited in the file of this patent

UNITED STATES PATENTS

| | | |
|---|---|---|
| 2,051,042 | Hendel et al. | Aug. 18, 1936 |
| 2,095,268 | Roberts | Oct. 12, 1937 |
| 2,470,850 | Harris | May 24, 1946 |
| 2,666,327 | Taylor | Jan. 18, 1954 |
| 2,688,873 | Burris-Meyer | Sept. 14, 1954 |
| 2,696,114 | Cummings | Dec. 7, 1954 |